United States Patent [19]
Daute et al.

[11] Patent Number: 5,382,647
[45] Date of Patent: Jan. 17, 1995

[54] POLYURETHANE-BASED FRIABLE SEALING COMPOUND

[75] Inventors: Peter Daute, Essen; Roland Gruetzmacher, Wuelfrath; Rainer Hoefer, Duesseldorf; Gerhard Stoll, Korschenbroich, all of Germany

[73] Assignee: Henkel Kommanditgesellschaft auf Aktien, Duesseldorf, Germany

[21] Appl. No.: 39,363

[22] PCT Filed: Oct. 7, 1991

[86] PCT No.: PCT/EP91/01899
  § 371 Date: Apr. 16, 1993
  § 102(e) Date: Apr. 16, 1993

[87] PCT Pub. No.: WO92/07017
  PCT Pub. Date: Apr. 30, 1992

[30] Foreign Application Priority Data
  Oct. 16, 1990 [DE] Germany ............... 4032843

[51] Int. Cl.⁶ .................................. C08G 18/58
[52] U.S. Cl. ....................... 528/73; 528/74.5; 528/905
[58] Field of Search ............. 528/73, 74.5, 905

[56] References Cited

U.S. PATENT DOCUMENTS

| | | | |
|---|---|---|---|
| 4,551,517 | 11/1985 | Herold et al. | 528/60 |
| 4,603,188 | 7/1986 | Kusakawa et al. | 528/60 |
| 4,826,944 | 5/1989 | Hoefer et al. | 528/49 |
| 4,886,893 | 12/1989 | Meffert et al. | 549/562 |

FOREIGN PATENT DOCUMENTS

| | | |
|---|---|---|
| 0111626 | 6/1984 | European Pat. Off. . |
| 0152585 | 8/1985 | European Pat. Off. . |
| 0259722 | 3/1988 | European Pat. Off. . |

*Primary Examiner*—John Kight, III
*Assistant Examiner*—R. Johnson
*Attorney, Agent, or Firm*—Ernest G. Szoke; Wayne C. Jaeschke; Real J. Grandmaison

[57] ABSTRACT

A polyurethane friable sealing compound free of solvent and plasticizer having a shore A hardness of below 40 and consisting essentially of a polyol component and an isocyanate component. The polyol component is selected from modified triglycerides obtained by partial ring opening of epoxidized triglycerides of a fatty acid mixture containing olefinically unsaturated fatty acids and monohydric or polyhydric alcohols. The isocyanate component is selected from polyfunctional aromatic and aliphatic isocyanates, wherein the OH:NCO equivalent ratio is from 1:0.1 to 1:1.15.

3 Claims, No Drawings

POLYURETHANE-BASED FRIABLE SEALING COMPOUND

BACKGROUND OF THE INVENTION

1. Field of the Invention

This invention relates to a polyurethane-based friable sealing compound produced from a polyol component and an isocyanate component.

In many fields of industry, a housing, a tube or similar articles have to be sealed at their open end(s) so that moisture or water is unable to penetrate. This applies in particular to cables for the transmission of information, for example in the communications field and in various parts of the electrical industry.

2. Discussion of Related Art

Communications cables consist of a plurality of electrically conductive wires which are bunched together, several such bunches being accommodated in an outer protective sheath. To join two such cables or even to join cables of different construction to one another, these bunches of wires have tn be fanned out and joined to the wires of the other cable. The individual wires thus joined have to be insulated from one another, so that, in some cases, a much more bulky structure is formed. Since the insulation of the individual wires was opened, this structure has to be protected against the penetration of moisture or water. This is done by so-called cable fittings in the form of connectors consisting of a joint box and a plastics material accommodated therein, this plastics material being known as a friable sealing compound because it is required to show high notch sensitivity. Friable sealing compounds can be removed easily by hand without any need for special tools. They must have a high volume resistance, for example where they are used in cable fittings, and in addition their so-called pot life during processing should be long but, if necessary, should be able to be shortened by addition of catalysts.

In view of the efforts being made to replace petrochemical products by renewable raw materials, it would be desirable if friable sealing compounds could be provided on the same basis. Finally, a friable sealing compound should as far as possible be a homogeneous product, i.e. a uniform product with no additives.

DESCRIPTION OF THE INVENTION

The problem of providing such friable sealing compounds pounds has been solved by the friable sealing compound according to claim 1. Further advantageous embodiment can be found in the subsidiary claims.

Accordingly, the friable sealing compounds according to the invention consist of only one technical product of which the polyol component is obtained from renewable raw materials. They have high stability in storage and a high electrical resistance coupled with excellent friability. In addition, they are free both from solvents and from plasticizers so that there is no separation or migration of such additives with the disadvantages normally involved. In addition, the friable sealing compounds according to the invention are, surprisingly, completely transparent which enables electrical connections etc. embedded in the friable sealing compound according to the invention to be visually and hence non-destructively inspected so that faults in need of repair can be located much more easily and unnecessary work and wastage of material can be avoided.

The polyol component according to the invention is selected from modified triglycerides, for example of the type described in DE-A1 32 46 612, which can be obtained by partial ring opening of epoxidized triglycerides of a fatty acid mixture at least partly containing olefinically unsaturated fatty acids with monohydric or polyhydric alcohols.

In principle, the isocyanate component according to the invention may be selected from any of the usual poly-functional aromatic and aliphatic isocyanates, such as for example even oligomeric or polymeric isocyanate compounds, of which HDI trimer (tris-6-isocyanatohexyl isocyanurate), polyisocyanate (4,4-diphenylmethane diisocyanate (MDI)) and HDI biuret (1,3,5-tri-(6-isocyanatohexyl)-biuret are mentioned as examples. Non-toxic compounds which do not require identification are particularly preferred.

The OH:NCO equivalent ratio is 1:0.1 to 1:1.15 and, more particularly, 1:0.4 to 1:1.25.

The friable sealing compounds according to the invention have volume resistances of $10^{10}$ ohm$\times$cm and higher. The volume resistances are determined in accordance with DIN 53482/VDI 0303, Part 3.

The hardness of the polyurethane-based friable sealing compounds according to the invention may if necessary be varied within wide limits through the epoxide value or the OH value of the ring-opened epoxidized triglyceride. Thus, a polyol component having a high epoxide value and a correspondingly low OH value leads to relatively soft friable sealing compounds while a polyol component having a low epoxide value and a correspondingly high OH value leads to relatively hard, i.e. highly crosslinked, friable sealing compounds.

The polyols suitable for use in accordance with the invention are prepared as follows:

EXAMPLE 1: PREPARATION OF POLYOL I 28.2 kg methanol and 0.444 kg sulfuric acid were introduced into a stirred tank reactor and heated with stirring to approx. 50° C. 103.8 kg soybean oil epoxide (Ep. 0=6.8%) were then added and the temperature was slowly increased to the reflux temperature of the methanol (approx. 65° C). After the addition, the epoxide value of the reaction mixture was monitored during the further course of the reaction. At an Ep. 0 value of 2.6% in the reaction mixture, the catalyst sulfuric acid was neutralized by addition of approx. 0.444 kg diethyl ethanolamine (pH control, pH=8-9) and the excess methanol was distilled off in vacuo. Approx. 110 kg of a clear yellow liquid are thus obtained (residual epoxide content 3.0%).

EXAMPLE 2: PREPARATION OF POLYOL II 3530 g soybean oil epoxide were reacted with 960 g methanol as in Example 1. At an epoxide value of 3.9% Ep. 0 in the reaction mixture, the catalyst sulfuric acid was neutralized with diethyl ethanolamine and the excess methanol was distilled off. The product (3600 g) is a yellow clear liquid (residual epoxide content 4.5%).

EXAMPLE 3: PREPARATION OF POLYOL III 400 kg soybean oil epoxide were reacted with 110 kg methanol as in Example 1. At an epoxide value of 4.4% Ep. 0 in the reaction mixture, the catalyst sulfuric acid was neutralized with diethyl ethanolamine and the excess methanol was distilled off. The product (406 kg) is a yellow clear liquid (residual epoxide content 5.3%).

Particulars of the production and properties of the completely transparent friable sealing compounds according to the invention are shown in Tables 1a and 1b below:

TABLE 1a

| | Isocyanate: HDI Trimer (NCO: 22%) Tris-(6-isocyanatohexyl isocyanurate) | | | |
|---|---|---|---|---|
| Example | 1 | 2 | 3 | 4 |
| Polyol | Polyol 3 | Polyol 2 | Polyol 1 | Polyol 1 |
| OH value | Approx. 50 | Approx. 70 | Approx. 105 | Approx. 105 |
| % Ep. O | 5.3 | 4.5 | 3.0 | 3.0 |
| Equimolar OH:NCO ratios | 1:1 | 1:1 | 1:1 | 1:0.5 |
| Polyol: isocyanate (parts by wt.) | 100:17 | 100:24 | 100:34 | 100:17 |
| Pot life[1] (mins.) | Approx. 120 | Approx. 90 | Approx. 90 | Approx. 90 |
| Shore A hardness | | | | |
| After 1 d | 5, Friable | 21, Friable | 45, Non-friable | 14, Friable |
| After 14 d | 15, Friable | 35, Friable | 60, Non-friable | 20, Friable |

[1]Room temperature with addition of 0.1% Formrez Ul 24 (a Witco product)

TABLE 1b

| | Isocyanate: MDI Polymer (NCO 30%) | | |
|---|---|---|---|
| Example | 5 | 6 | 7 |
| Polyol | Polyol 3 | Polyol 2 | Polyol 1 |
| OH value | Approx. 50 | Approx. 70 | Approx. 105 |
| % Ep. O | 5.3 | 4.5 | 3.0 |
| Equimolar OH:NCO ratios | 1:0.74 | 1:0.73 | 1:0.74 |
| Polyol: isocyanate (parts by wt.) | 100:12.5 | 100:17.5 | 100:26 |
| Pot life[1] (mins.) | Approx. 90 | Approx. 60 | Approx. 30 |
| Shore A hardness | | | |
| After 1 d | 5, Friable | 5, Friable | 45, Non-friable |
| After 14 d | 15, Friable | 25, Friable | 65, Non-friable |

[1]Room temperature with addition of 0.1% Formrez Ul 24 (a Witco product)

It can be seen from Tables 1a and 1b that Examples 3 and 7 relate to compounds which are not suitable as friable sealing compounds according to the invention, as reflected in the shore A hardness values. It may generally be assumed that compounds having a Shore A hardness of about 40 or higher lead to unsatisfactory products.

Tables 2 and 3 below provide further particulars of the starting materials and properties of the compounds obtained. The polyols listed in Table 2 are soya polyols containing approx. 3%, 4.5% and 5.3% epoxide oxygen according to DE-A1 33 46 612. These soya polyols were cast with isocyanate in various equimolar OH:NCO ratios and the electrical volume resistances were measured.

In the event of undercrosslinking with isocyanate, there was a deterioration in the electrical properties and an increase in the tackiness of the compound obtained.

It can be seen from Table 3 that friability, good electrical properties and minimal tackiness were obtained using the soya polyol polyol 3 (OH value 50/epoxide oxygen 5.3%) and the soya polyol polyol 2 (OH value 70/epoxide oxygen 4.7%) after equimolar crosslinking with an HDI trimer.

Hardening of the compounds obtained was accelerated by addition of the catalyst Formrez UL 24.

The addition of soybean oil epoxide (Edenol D 81, a product of Henkel KGaA) to polyol 1 led to exudation of the plasticizer after casting with the HDI trimer, so that the product obtained was unsatisfactory.

TABLE 2

| Raw material specifications | | | |
|---|---|---|---|
| Polyols | OH Value | OH Equivalent | % Fr. epoxide |
| Polyol 1 | Approx. 100 | 561 | Approx. 3 |
| Polyol 2 | Approx. 70 | 800 | Approx. 4.7 |
| Polyol 3 | Approx. 50 | 1122 | Approx. 5.3 |
| Isocyanate | % NCO | NCO Equivalent | |
| HDI trimer 22% NCO | 22 | 191 | |
| Catalyst | Formrez UL 24 (organotin compound) (Witco) | | |
| Formulation: | 100.0 parts polyol | | |
| | 0.1 part Formrez UL 24 | | |
| | X parts HDI trimer (dependent upon the OH value of the polyol) | | |

TABLE 3

| | Mixing ratio OH:NCO (parts by wt.) | Equimolar OH:NCO ratio | Properties | |
|---|---|---|---|---|
| | | | Volume resistivity ($\Omega \cdot$ Ohm) | Remarks |
| Polyol 1 | 100:18 | 1:0.53 | $5.0 \cdot 10^{10}$ | 47% undercrosslinked readily friable, slightly tacky |
| | 100:15 | 1:0.44 | $3.5 \cdot 10^{10}$ | 56% undercrosslinked friable, very tacky |
| | 100:12 | 1:0.35 | Cannot be measured - material too tacky | |
| Polyol 2 | 100:24 | 1:1 | $1.09 \cdot 10^{11}$ | 100% crosslinked, barely tacky, readily friable |
| | 100:20 | 1:0.83 | $7.5 \cdot 10^{10}$ | 17% undercrosslinked slightly tacky, readily friable |
| | 100:16 | 1:0.67 | $2.7 \cdot 10^{10}$ | 34% undercrosslinked, very tacky, readily friable |
| Polyol 3 | 100:17 | 1:1 | $1.6 \cdot 10^{10}$ | 100% crosslinked, slightly tacky highly friable |
| | 100:15 | 1:0.88 | $1.4 \cdot 10^{10}$ | 12% undercrosslinked, very tacky, readily friable |
| | 100:13 | 1:0.76 | $1.3 \cdot 10^{10}$ | 24% undercrosslinked, extremely tacky, friable |

Hardener: HDI trimer, 22% NCO

We claim:

1. A polyurethane friable sealing compound free of solvent and plasticizer, said sealing compound consisting essentially of a polyol component and an isocyanate component, said polyol component being selected from the group consisting of modified triglycerides obtained by partial ring opening of epoxidized triglycerides of a fatty acid mixture containing olefinically unsaturated fatty acids with monohydric or polyhydric alcohols, said isocyanate component being selected from the group consisting of polyfunctional aromatic and aliphatic isocyanates, wherein the OH:NCO equivalent ratio is from 1:0.1 to 1:1.5 and the OH value of the polyol, and the OH:NCO ratio of said friable sealing compound result in said friable sealing compound having a Shore A hardness value of less than about 40.

2. A sealing compound as in claim 1 having a volume resistance of at least $10^{10}$ ohm×cm as determined in accordance with 3. A sealing compound as in claim 1 wherein said isocyanate component is selected from the group consisting of tris-6isocyanatohexyl isocyanurate, 4,4-diphenylmethane diisocyanate, and 1,3,5-tri-(6-isocyanatohexyl)-biuret.

* * * * *